United States Patent
Bhogal et al.

(10) Patent No.: US 9,253,275 B2
(45) Date of Patent: Feb. 2, 2016

(54) COGNITIVE DYNAMIC ALLOCATION IN CACHING APPLIANCES

(75) Inventors: Kulvir Singh Bhogal, Pflugerville, TX (US); Nitin Gaur, Round Rock, TX (US); Christopher Douglas Johnson, Rochester, MN (US); Todd Eric Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 13/361,066

(22) Filed: Jan. 30, 2012

(65) Prior Publication Data

US 2013/0198400 A1 Aug. 1, 2013

(51) Int. Cl.
*G06F 15/16* (2006.01)
*H04L 29/08* (2006.01)
*G06F 3/06* (2006.01)
*H04L 29/06* (2006.01)

(52) U.S. Cl.
CPC .............. *H04L 67/2842* (2013.01); *G06F 3/06* (2013.01); *G06F 3/067* (2013.01); *G06F 3/0647* (2013.01); *H04L 67/1097* (2013.01); *H04L 67/125* (2013.01); *H04L 67/2819* (2013.01); *H04L 69/18* (2013.01)

(58) Field of Classification Search
CPC ...................... H04L 67/1097; H04L 29/08549; H04L 67/322; H04L 67/28; H04L 67/2842; H04L 69/18; H04L 67/125; G06F 13/387; G06F 3/067; G06F 3/0644; G06F 3/0647

USPC ......................................................... 709/230
See application file for complete search history.

(56) References Cited

U.S. PATENT DOCUMENTS

| | | | |
|---|---|---|---|
| 6,944,715 B2 | 9/2005 | Britton et al. | 711/129 |
| 7,529,903 B2 | 5/2009 | Boss et al. | 711/165 |
| 7,765,167 B2* | 7/2010 | Prahlad | G06F 3/0605 |
| | | | 705/400 |
| 2004/0034740 A1* | 2/2004 | Britton et al. | 711/129 |
| 2004/0230753 A1 | 11/2004 | Amiri et al. | 711/147 |
| 2006/0190552 A1* | 8/2006 | Henze et al. | 709/216 |
| 2007/0011420 A1* | 1/2007 | Boss et al. | 711/165 |
| 2007/0168394 A1* | 7/2007 | Vivekanand | H04L 67/322 |
| 2008/0177970 A1* | 7/2008 | Prahlad et al. | 711/170 |
| 2010/0161768 A1* | 6/2010 | Daniel | H04L 67/1097 |
| | | | 709/220 |
| 2011/0138136 A1* | 6/2011 | Shitomi | G06F 3/0604 |
| | | | 711/154 |

* cited by examiner

*Primary Examiner* — Richard G Keehn
*Assistant Examiner* — Mohammed Ahmed
(74) *Attorney, Agent, or Firm* — Van Leeuwen & Van Leeuwen; William J. Stock

(57) ABSTRACT

An approach is provided in which a caching appliance receives a data packet over a network connection utilizing a network protocol. The caching appliance selects a storage area based upon the network protocol and stores the data packet in the selected storage area. In one embodiment, the caching appliance identifies a service level that corresponds to the network protocol and selects the storage area based upon the identified service level.

20 Claims, 7 Drawing Sheets

COGNITIVE DYNAMIC ALLOCATION IN CACHING APPLIANCES

BACKGROUND

The present disclosure relates to dynamically utilizing storage areas in caching appliances. More particularly, the present disclosure relates to receiving a data packet over a network connection and storing the data packet in a storage area type that corresponds to the network connection's protocol.

New caching appliances support "multi-protocol" access, which receives data/requests from various devices over a wide variety of protocols. For example, a caching appliance may receive data over protocols such as HTTP (Hypertext Transfer Protocol), LDAP (Lightweight Directory Access Protocol), ORB (Object Request Brokers), and ReST (Representational State Transfer). Such caching appliances may also support different storage area types having different access latencies, such as a memory area (e.g., RAM), a solid state drive (SSD), and a hard disk drive (HDD).

BRIEF SUMMARY

According to one embodiment of the present disclosure, an approach is provided in which a caching appliance receives a data packet over a network connection utilizing a network protocol. The caching appliance selects a storage area based upon the network protocol and stores the data packet in the selected storage area. In one embodiment, the caching appliance identifies a service level that corresponds to the network protocol and selects the storage area based upon the identified service level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
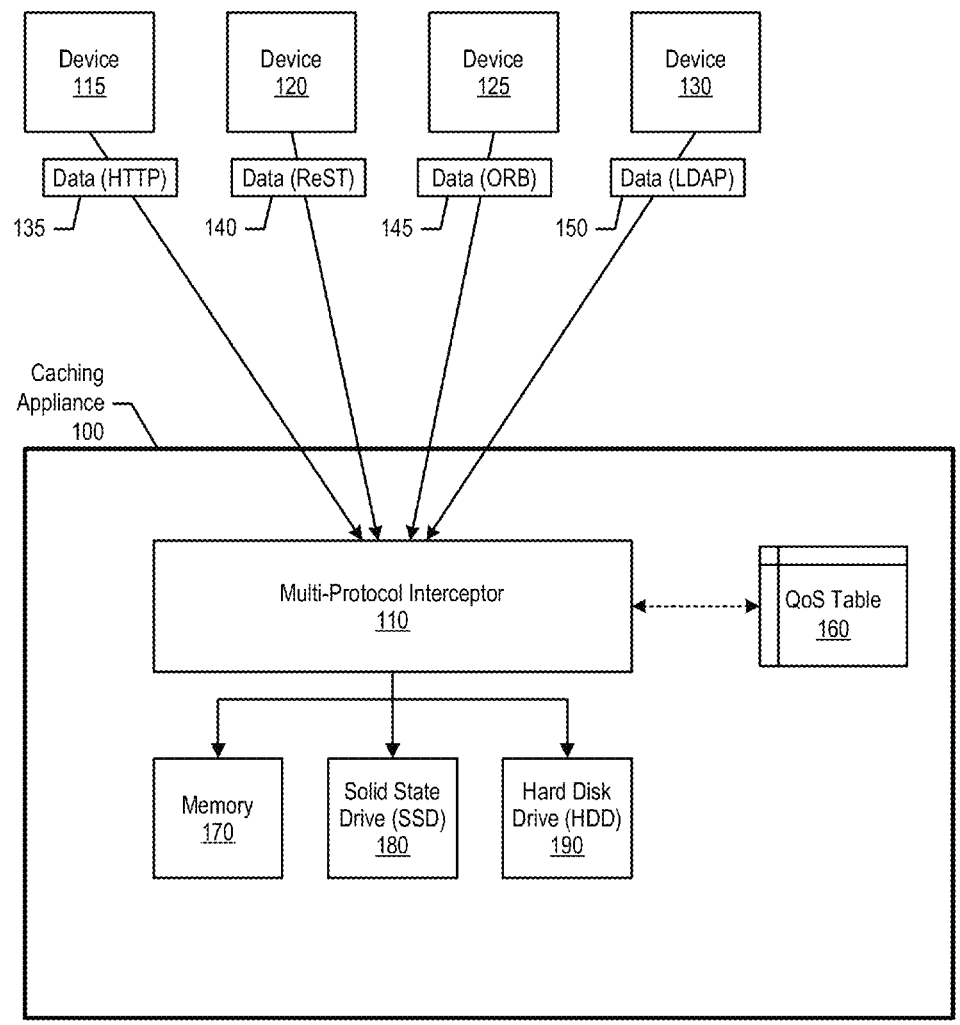
FIG. 1 is an exemplary diagram showing a caching appliance storing data packets in different storage areas based upon protocols over which the caching appliance receives the data packets.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is an exemplary diagram showing a caching appliance storing data packets in different storage areas based upon protocols over which the caching appliance receives the data packets. Caching appliance includes multi-protocol interceptor module 110, which serves as proxy that provides a data packet mapping to different storage types mapping located in caching appliance 100. The example shown in FIG. 1 shows that caching appliance 100 includes three storage areas, which are memory 170, solid-state drive (SSD) 180, and hard disk drive (HDD) 190. Multi-protocol interceptor module 110 also serves as an intelligent engine that directs appropriate storage area allocation based on protocol specific traffic (see FIG. 2B and corresponding text for further details).

Multi-protocol interceptor module 110 provides discriminating (and configurable) quality of service based upon network protocol types. In one embodiment, multi-protocol interceptor module 110 may be a software module executing on caching appliance 100 to provide enhanced configurability features. In another embodiment, multi-protocol interceptor module 110 may be a hardware module to provide faster data access. In yet another embodiment, multi-protocol interceptor module 110 may be a combination of software and hardware in order to provide fast data access along with configurability support.

An administrator configures quality of service (QoS) table entries included in QoS table 160. The QoS table entries include a protocol type, a service level, an assigned storage type, and may include a preferred storage type. The assigned storage type is a type of storage that the administrator assigns to a particular service level. The preferred storage type is a type of storage that multi-protocol interceptor module 110 utilizes to store data packets when space (a memory location) is available (see FIG. 2A and corresponding text for further details).

As such, multi-protocol interceptor module 110 receives data packets 135-150 from devices 115-130 over HTTP, ReST, ORB, and LDAP protocols, respectively and, in turn, stores the data packets in their respective storage areas 170-190. For example, a ReST protocol type may have a "Gold" Service level, which has an assigned storage type of "SSD" and a preferred storage type of "Memory." In this example, when multi-protocol interceptor module 110 receives a data packet over a ReST protocol, multi-protocol interceptor module 110 checks if a memory location is available in memory 170 and, if so, stores the data packet in the available memory location. On the other hand, if memory 170 does not have an available memory location, multi-protocol interceptor module 110 stores the data packet in the assigned storage type, which is solid-state drive 180.

Figures 2A, 2B:
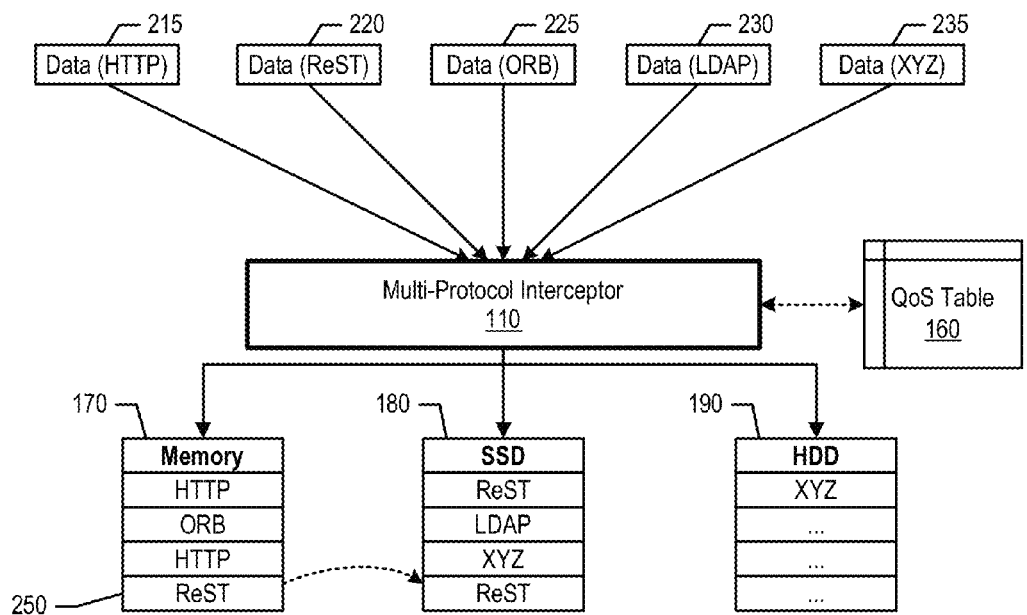
FIG. 2A is an exemplary diagram showing a quality of service (QoS) table that includes QoS table entries.
FIG. 2B is an exemplary diagram showing a multi-protocol interceptor module managing available storage space based upon protocol-specific network traffic.

FIG. 2A is an exemplary diagram showing a quality of service (QoS) table that includes QoS table entries. The QoS table entries link protocol types to service levels, which correspond to various storage parameters, such as an assigned storage type and a preferred storage type. Each of the different storage types inherently includes an access latency (added delay to access data (read/write). For example, memory (RAM) may have a relatively short access latency whereas a hard disk drive (HDD) may have a relatively long access latency. As such, an administrator assigns "higher" service levels to storage types with shorter access latencies.

Table 160 includes columns 200-212. Column 200 includes protocols that devices utilize to send data packets to the multi-protocol interceptor module (see FIG. 3 and corresponding text for further details). Column 205 includes service levels that an administrator assigns to the protocols included in column 200. As can be seen in the example shown in FIG. 2, an administrator assigns a "platinum" service level to HTTP and ORB service levels.

Column 210 includes storage types that the administrator assigns to the service levels shown in column 205. Column 212 includes storage types that the administrator indicates as "preferred" storage types of the service levels shown in column 205. The preferred storage types correspond to storage areas in which the multi-protocol interceptor module stores data packets if memory locations are available. Preferred storage types typically have lower access latencies than their assigned storage type counterparts for a particular service level.

FIG. 2B is an exemplary diagram showing a multi-protocol interceptor module managing available storage space based upon protocol-specific network traffic. Multi-protocol interceptor module 110 receives data packets 215-235 over various protocols. As such, multi-protocol interceptor module 110 access quality of service table 160 and identifies storage areas (e.g., assigned storage type or preferred storage type) based upon each data packet's corresponding protocol.

In one embodiment, multi-protocol interceptor module 110 institutes a "tiered" storage location mechanism. The tiered storage location mechanism allows multi-protocol interceptor module 110 to utilize storage parameters in quality of service table 160 and store data entries in a preferred storage area when memory locations are available. At a particular point, a storage area may fill, in which case multi-protocol interceptor module 110 moves "lower tier" data entries from their preferred storage area to their assigned storage area.

FIG. 2B shows memory location 250 in memory 170 includes a data entry that multi-protocol interceptor module 110 received over a ReST protocol. FIG. 2A shows that the ReST protocol corresponds to a "Gold" service level, which corresponds to an assigned storage type of "SSD" and a preferred storage type of "Memory." At some point, multi-protocol interceptor module 110 receives data packet 215 over the HTTP protocol, which FIG. 2A shows to correspond with a "Platinum" service level. Since memory 170 does not have an available memory location to store data packet 215, multi-protocol interceptor module 110 analyzes memory 170 and determines that the data packet in memory location 250 should move to its assigned storage area, which is SSD 180. As such, multi-protocol interceptor module 110 moves the data entry in memory location 250 to a memory location in SSD 180, thus freeing up space for multi-protocol interceptor module 110 to store data packet 215 in memory 170.

Figure 3:
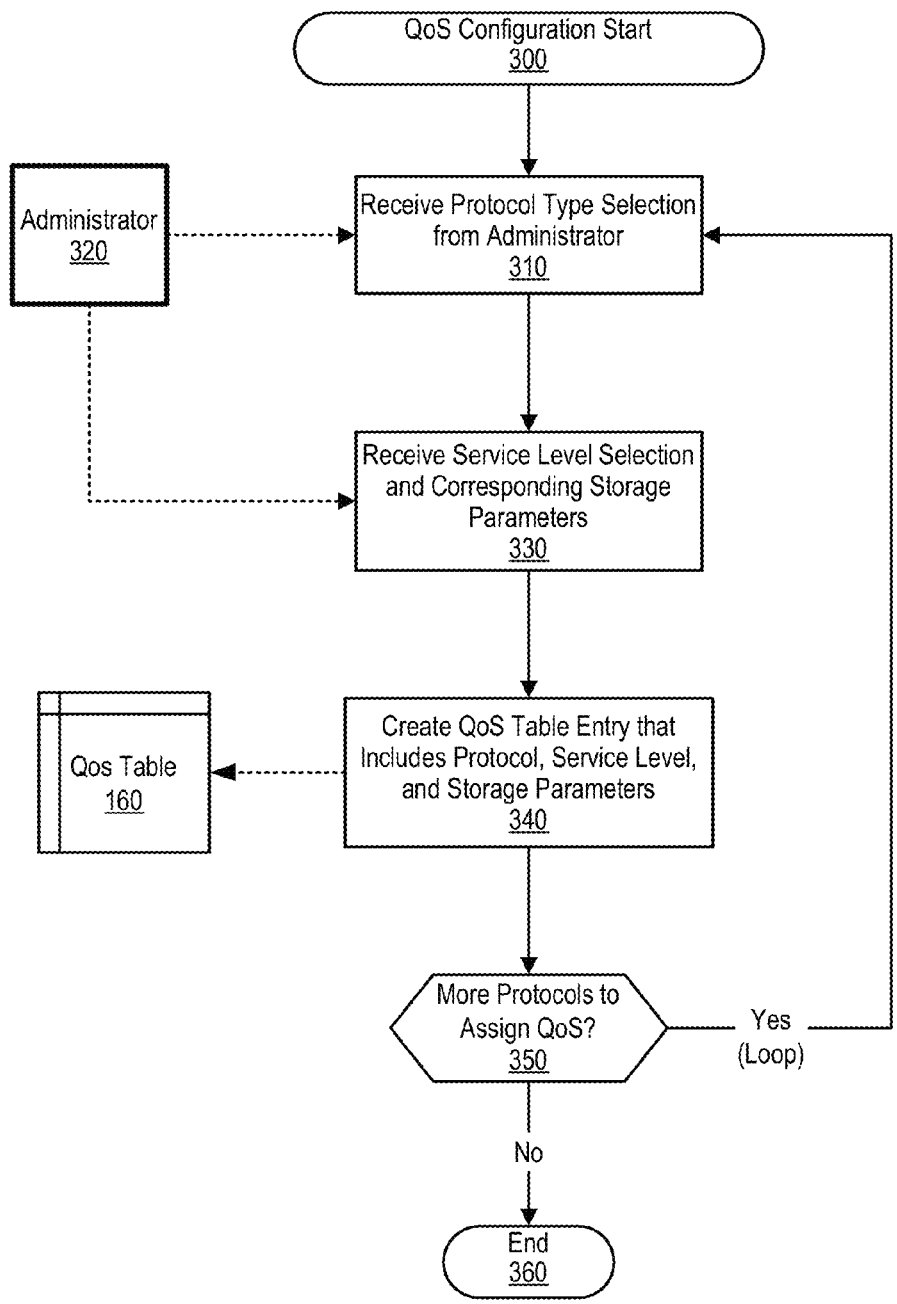
FIG. 3 is an exemplary flowchart showing steps taken in an administrator configuring quality of service table entries that links protocols to service levels.

FIG. 3 is an exemplary flowchart showing steps taken in an administrator configuring quality of service table entries that links protocols to service levels. Processing commences at 300, whereupon the multi-protocol interceptor module receives a protocol type selection from administrator 320 at step 310. For example, the multi-protocol interceptor module may display a user interface to administrator 320, which allows administrator 320 the ability to select or type in a particular protocol type (e.g., HTTP, ReST, LDAP, etc.). At step 330, the multi-protocol interceptor module receives a service level selection and storage parameters from administrator 320 that correspond to the protocol type selection. For example, administrator 320 may select an "HTTP" protocol type, a "GOLD" service level, and storage parameters that include "SSD" as an assigned storage type and "MEMORY" as a preferred storage type.

The multi-protocol interceptor module creates a quality of service table entry in QoS table 160 at step 340. The table entry includes the protocol type, the service level selection, and the storage parameters (see FIG. 2A and corresponding text for further details). The multi-protocol interceptor module determines whether administrator 320 wishes to create additional table entries (decision 350). If administrator 320 wishes to create additional table entries, decision 350 branches to the "Yes" branch, which loops back to process additional table entry requests. This looping continues until administrator 320 finishes entering quality of service information, at which point decision 350 branches to the "No" branch, whereupon configuration processing ends at 360.

Figure 4:
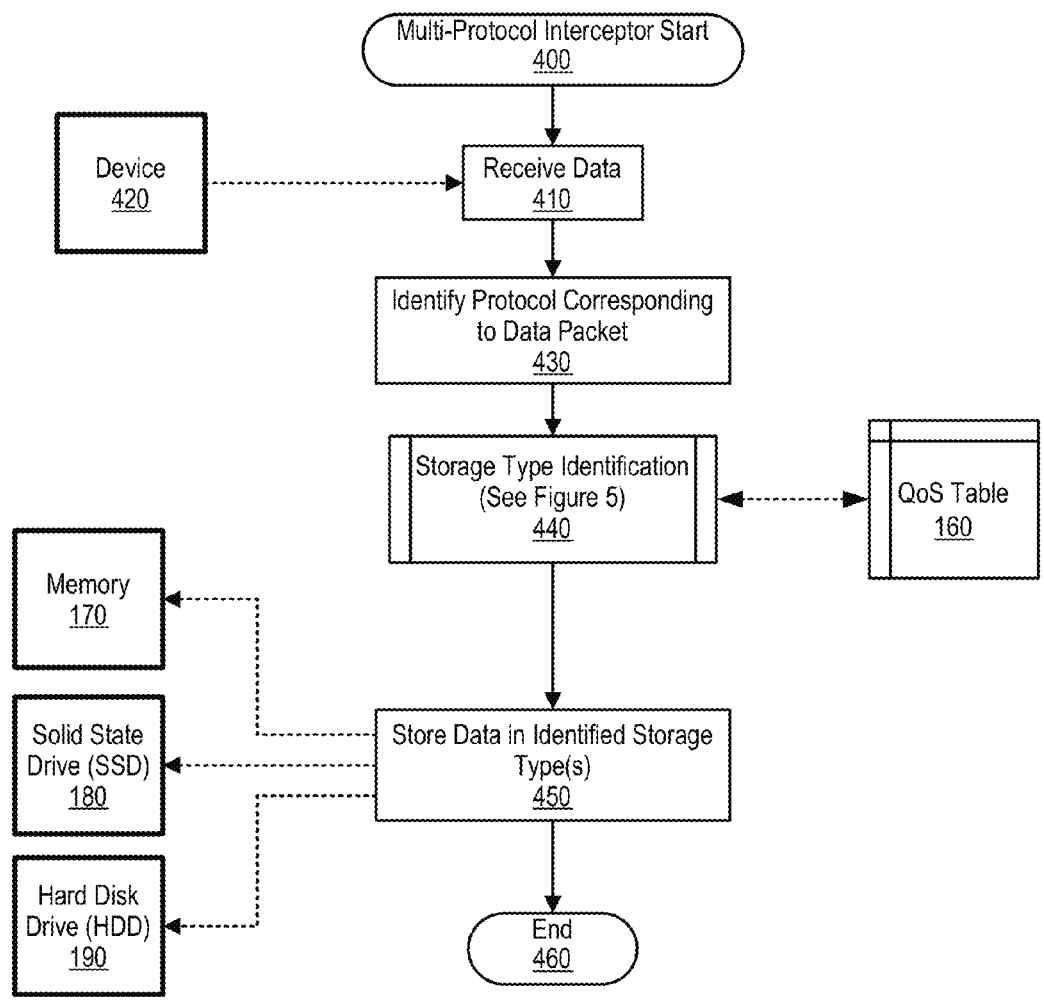
FIG. 4 is an exemplary flowchart showing steps taken in receiving data packets and storing the data packets in storage areas based upon protocols types over which a caching appliance receives the data packets.

FIG. 4 is an exemplary flowchart showing steps taken in receiving data packets and storing the data packets in storage areas based upon protocols types over which a caching appliance receives the data packets. Processing commences at 400, whereupon the multi-protocol interceptor module receives a data packet from device 420 at step 410.

Device 420 utilizes a particular protocol to send the data packet to the multi-protocol interceptor module, such as an HTTP protocol or an LDAP protocol. The multi-protocol interceptor module identifies the particular protocol at step 430, and accesses quality of service table 160 to identify a service level corresponding to the identified protocol and a storage area that corresponds to the identified service level (pre-defined process block 440, see FIG. 5 and corresponding text for further details).

Figure 5:
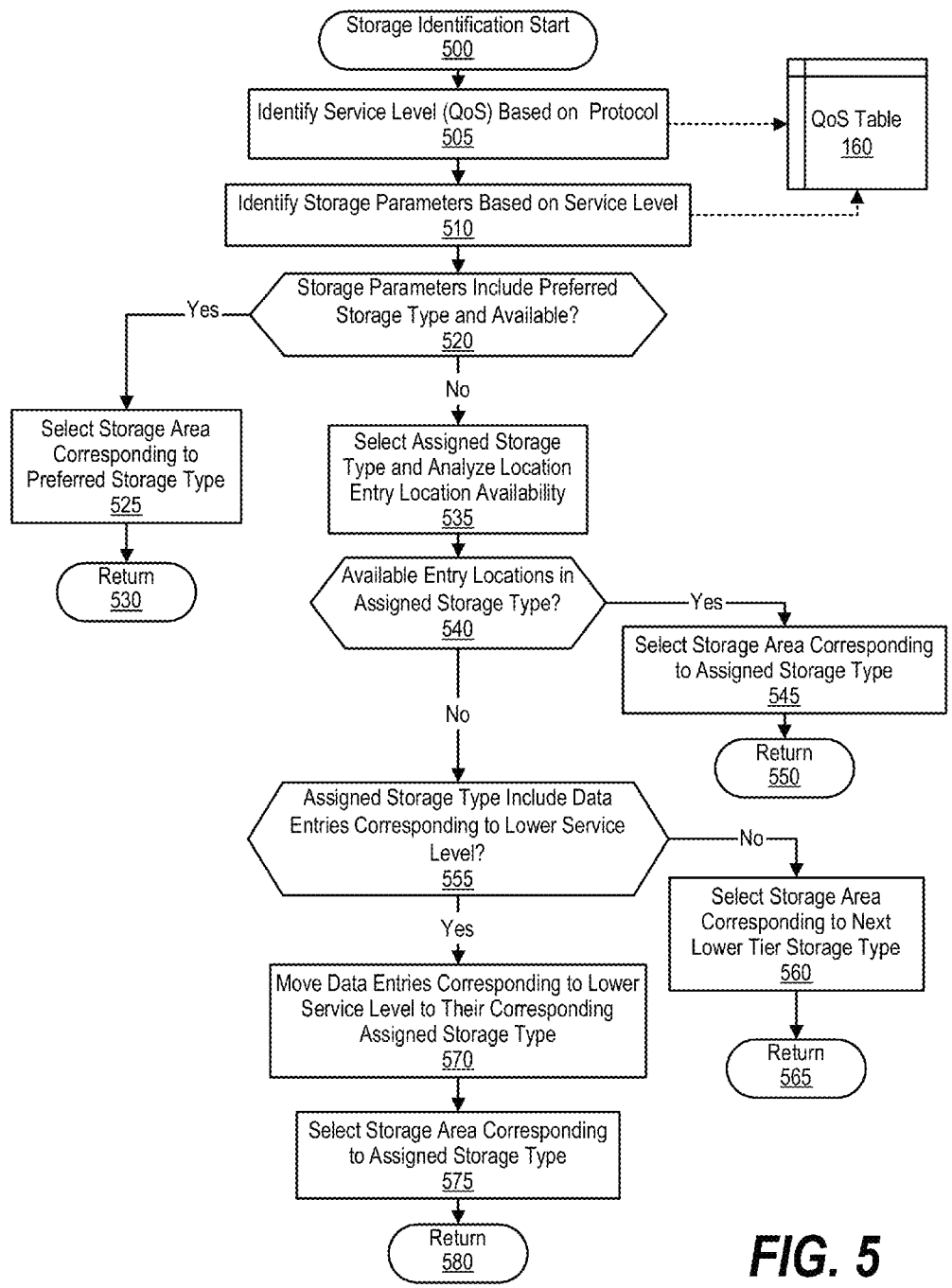
FIG. 5 is an exemplary flowchart showing steps taken in a multi-protocol interceptor module identifying a storage area to store a data packet based upon a protocol corresponding to the data packet.

At step 450, the multi-protocol interceptor module stores the data packet in one or more of storage areas 170-190 based upon which of storage areas 170-190 the multi-protocol interceptor module selects in the steps shown in FIG. 5. Processing ends at 460.

FIG. 5 is an exemplary flowchart showing steps taken in a multi-protocol interceptor module identifying a storage area to store a data packet based upon a protocol corresponding to the data packet.

Storage identification processing commence at 500, whereupon the multi-protocol interceptor module accesses quality of service table 160 and identifies a service level that corresponds to the protocol used to send the data packet (step 505). For example, the multi-protocol interceptor module may receive the data packet over an HTTP protocol, in which case the multi-protocol interceptor module identifies a service level that corresponds to the HTTP protocol.

At step 510, the multi-protocol interceptor module identifies storage parameters that correspond to the identified service level. For example, a "Gold" service level may include preferred storage type and assigned storage type storage parameters.

The multi-protocol interceptor module determines whether the storage parameters include a preferred storage type and whether a memory location is available in a corresponding preferred storage area (decision 520). Using the example described above, the "Gold" service level's "preferred" storage area may have an open location entry for which to store the data package. If the service level includes a preferred storage area and a memory location is available, decision 520 branches to the "Yes" branch, whereupon the multi-protocol interceptor module selects a storage area corresponding to the preferred storage type (step 525), and processing returns at 530.

On the other hand, if the storage parameters do not include a preferred storage type, or if the corresponding preferred storage area does not include an available memory location, decision 520 branches to the "No" branch, whereupon the multi-protocol interceptor module selects the service level's assigned storage type and analyzes the memory location availability at step 535. For example, the service level's assigned storage type may be an SDD storage type and, in this example, the multi-protocol interceptor module checks whether a corresponding SDD has memory locations available to store the data packet.

The multi-protocol interceptor module determines whether the corresponding assigned storage area includes an available memory location at decision 540. If the corresponding assigned storage area includes an available memory location, decision 540 branches to the "Yes" branch, whereupon the multi-protocol interceptor module selects a storage area corresponding to the assigned storage type (step 545), and processing returns at 550.

On the other hand, if the corresponding assigned storage area does not have an available memory location, decision 540 branches to the "No" branch, whereupon the multi-protocol interceptor module determines whether one or more memory locations included in the assigned storage area include data entries that correspond to a lower service level (decision 555). For example, the assigned storage area may be memory, which the multi-protocol interceptor module may have previously stored data corresponding to a service level that included the memory as a preferred storage area (see FIG. 2A and corresponding text for further details).

If the corresponding assigned memory area includes "lower tier" data entries, decision 555 branches to the "Yes" branch, whereupon the multi-protocol interceptor module moves the lower tier data entries to their respective assigned storage areas at step 570, which frees up one or more location entries (see FIG. 2B and corresponding text for further details). As such, the multi-protocol interceptor module selects the storage area corresponding to the assigned storage type at step 575, and processing returns at 580.

On the other hand, referring back to decision 555, if the corresponding assigned storage area does not include lower tier data entries, decision 555 branches to the "No" branch, whereupon the multi-protocol interceptor module selects a storage area corresponding to the next lower tier storage type at step 560, and processing returns at 565.

Figure 6:
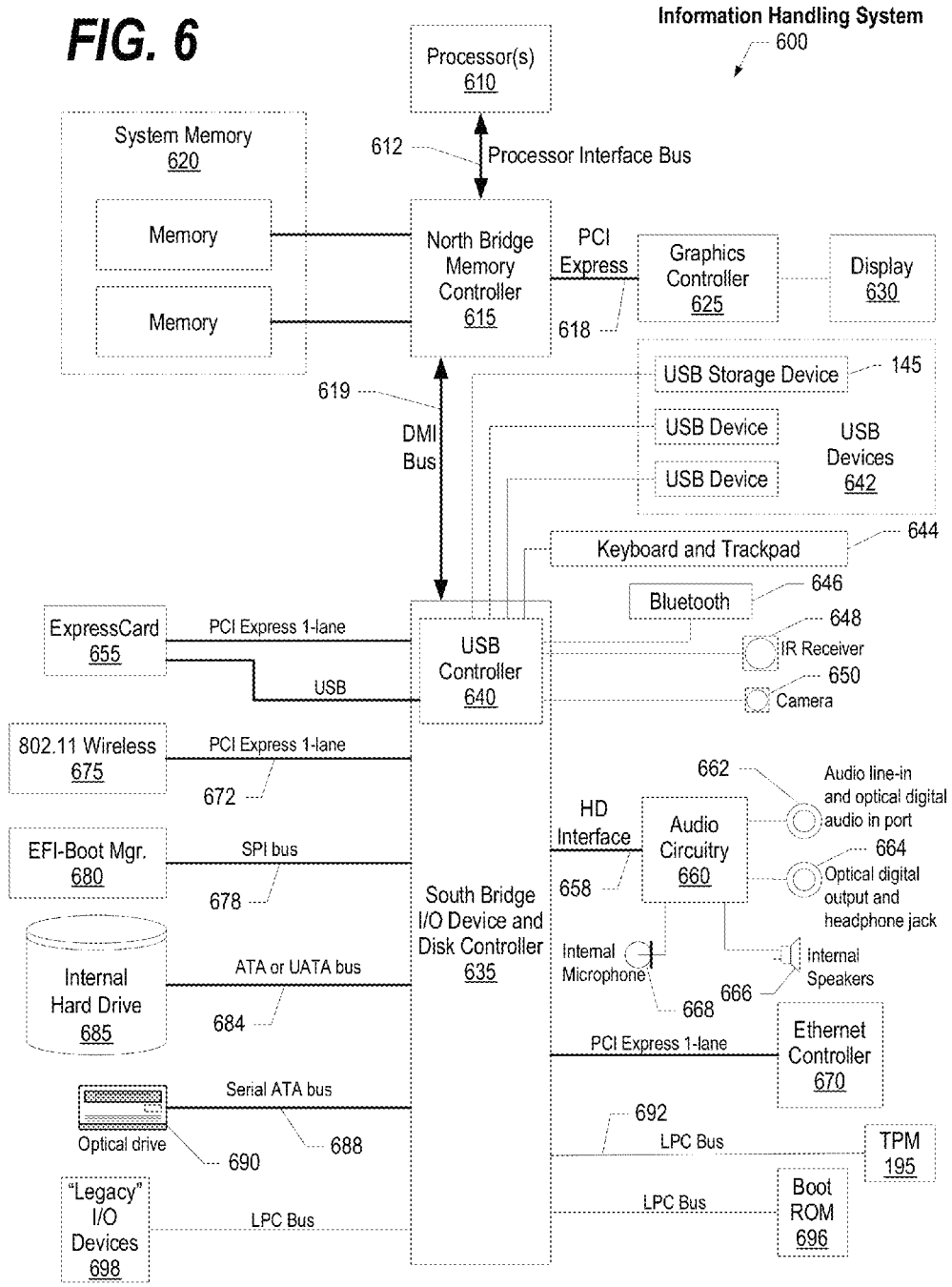
FIG. 6 is a block diagram of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While FIG. 6 shows removable nonvolatile storage device 645 as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wirelessly communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
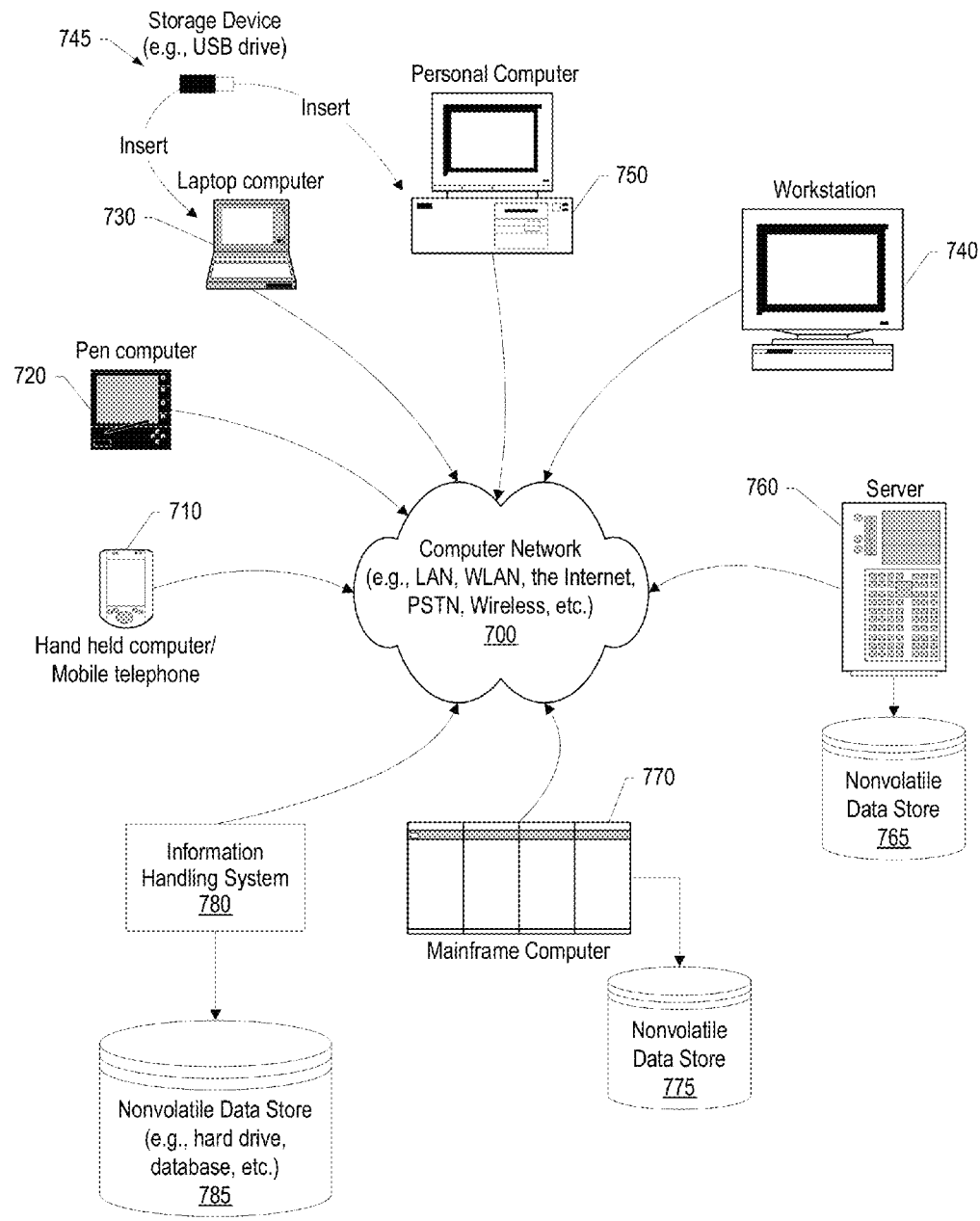
FIG. 7 provides an extension of the information handling system environment shown in FIG. 6 to illustrate that a wide variety of information handling systems, which operate in a networked environment, may perform the methods described herein.

FIG. 7 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 645 is shared among two or more information handling systems using various techniques, such as connecting the removable nonvolatile storage device 645 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a data packet at a caching appliance from a first device communicating over a network connection that utilizes a first protocol type to provide the data packet, wherein the first protocol type is included in a plurality of protocol types supported by the caching appliance, and wherein the caching appliance includes one or more processors;
   determining, by at least one of the one or more processors, whether a preferred storage area corresponding to the first protocol type includes an available memory location; and
   storing, by at least one of the one or more processors, the data packet in an assigned storage area corresponding to the first protocol type in response to determining that the preferred storage area fails to include the available memory location.

2. The method of claim 1 further comprising:
   identifying a first service level from a plurality of service levels that corresponds to the first protocol type;
   identifying an assigned storage type corresponding to the first service level, the assigned storage type included in a plurality of storage types; and
   wherein the assigned storage area is the the assigned storage type.

3. The method of claim 2 wherein a preferred storage type corresponds to the first service level, and wherein the preferred storage area is the preferred storage type.

4. The method of claim 2 further comprising:
   wherein each of the plurality of service levels corresponds to a quality of service;
   wherein each of the plurality of storage types correspond to one of a plurality of access latencies; and
   assigning each of the plurality of service levels to one of the plurality of storage types based upon the plurality of access latencies.

5. The method of claim 4 wherein the caching appliance assigns each of the plurality of storage types to one of the plurality of service levels based upon their corresponding access latencies.

6. The method of claim 2 wherein the assigned storage area includes a plurality of memory locations, the method further comprising:
   determining that each of the plurality of memory locations included in the assigned storage area are unavailable to store the data packet;
   identifying one or more data entries included in one or more of the plurality of memory locations that correspond to a second service level; and
   moving the one or more identified data entries to a different storage area that corresponds to the second service level, wherein the different storage area has a longer access latency than the assigned storage area.

7. The method of claim 2 further comprising:
   determining that each of a plurality of memory locations included in the assigned storage area are unavailable to store the data packet and each of the plurality of memory locations include data entries that correspond to the first service level; and storing the data packet in a different storage area, wherein the different storage area has a longer access latency than the first storage area.

8. An information handling system comprising:
one or more processors;
a memory coupled to at least one of the processors;
a plurality of storage areas accessible by at least one of the processors;
a set of computer program instructions stored in the memory and executed by at least one of the processors in order to perform actions of:
receiving a data packet from a first device communicating over a network connection that utilizes a first protocol type to provide the data packet, wherein the first protocol type is included in a plurality of protocol types supported by the information handling system;
determining whether a preferred storage area corresponding to the first protocol type includes an available memory location; and
storing the data packet in an assigned storage area corresponding to the first protocol type in response to determining that the preferred storage area fails to include the available memory location.

9. The information handling system of claim 8 wherein the processors perform additional actions comprising:
identifying a first service level from a plurality of service levels that corresponds to the first protocol type;
identifying an assigned storage type corresponding to the first service level, the assigned storage type included in a plurality of storage types; and
wherein the assigned storage area is the the assigned storage type.

10. The information handling system of claim 9 wherein a preferred storage type corresponds to the first service level, and wherein the preferred storage area is the preferred storage type.

11. The information handling system of claim 9 wherein the processors perform additional actions comprising:
wherein each of the plurality of service levels corresponds to a quality of service;
wherein each of the plurality of storage types correspond to one of a plurality of access latencies; and
assigning each of the plurality of service levels to one of the plurality of storage types based upon the plurality of access latencies.

12. The information handling system of claim 11 wherein the information handling system assigns each of the plurality of storage to one of the plurality of service levels based upon their corresponding access latencies.

13. The information handling system of claim 9 wherein the assigned storage area includes a plurality of memory locations, the processors performing additional actions comprising:
determining that each of the plurality of memory locations included in the assigned storage area are unavailable to store the data packet;
identifying one or more data entries included in one or more of the plurality of memory locations that correspond to a second service level; and
moving the one or more identified data entries to a different storage area that corresponds to the second service level, wherein the different storage area has a longer access latency than the assigned storage area.

14. The information handling system of claim 9 wherein the processors perform additional actions comprising:
determining that each of a plurality of memory locations included in the assigned storage area are unavailable to store the data packet and each of the plurality of memory locations include data entries that correspond to the first service level; and
storing the data packet in different storage area, wherein the different storage area has a longer access latency than the first storage area.

15. A computer program product stored in a non-transitory computer readable storage medium, comprising computer program code that, when executed by an information handling system, causes the information handling system to perform actions comprising:
receiving a data packet from a first device communicating over a network connection that utilizes a first protocol type to provide the data packet, wherein the first protocol type is included in a plurality of protocol types supported by the information handling system;
determining whether a preferred storage area corresponding to the first protocol type includes an available memory location; and
storing the data packet in an assigned storage area corresponding to the first protocol type in response to determining that the preferred storage area fails to include the available memory location.

16. The computer program product of claim 15 the information handling system performs further actions comprising:
identifying a first service level from a plurality of service levels that corresponds to the first protocol type;
identifying an assigned storage type corresponding to the first service level, the assigned storage type included in a plurality of storage types; and
wherein the assigned storage area is the the assigned storage type.

17. The computer program product of claim 16 wherein a preferred storage type corresponds to the first service level, and wherein the preferred storage area is the preferred storage type
determining whether a preferred storage area corresponding to the preferred storage type includes an available memory location;
selecting the preferred storage area to store the data packet in response to determining that the preferred storage area includes an available memory location; and
selecting the assigned storage area to store the data packet in response to determining that the preferred storage area fails to include an available memory location.

18. The computer program product of claim 16 wherein the information handling system performs further actions comprising:
wherein each of the plurality of service levels corresponds to a quality of service;
wherein each of the plurality of storage types correspond to one of a plurality of access latencies; and
assigning each of the plurality of service levels to one of the plurality of storage types based upon the plurality of access latencies.

19. The computer program product of claim 18 wherein the information handling system assigns each of the plurality of storage types to one of the plurality of service levels based upon their corresponding access latencies.

20. The computer program product of claim 16 wherein the first storage area includes a plurality of memory locations, the information handling system performing additional actions comprising:
determining that each of the plurality of memory locations included in the assigned storage area are unavailable to store the data packet;

identifying one or more data entries included in one or more of the plurality of memory locations that correspond to a second service level; and moving the one or more identified data entries to a different storage area that corresponds to the second service level, wherein the different storage area has a longer access latency than the assigned storage area.

\* \* \* \* \*